US009444634B2

(12) United States Patent
Pani et al.

(10) Patent No.: US 9,444,634 B2
(45) Date of Patent: Sep. 13, 2016

(54) MISCABLING DETECTION PROTOCOL

(71) Applicant: Cisco Technology, Inc., San Jose, CA (US)

(72) Inventors: Ayaskant Pani, Fremont, CA (US); Navindra Yadav, Cupertino, CA (US); Krishna Doddapaneni, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 15 days.

(21) Appl. No.: 14/448,733

(22) Filed: Jul. 31, 2014

(65) Prior Publication Data

US 2015/0124643 A1 May 7, 2015

Related U.S. Application Data

(60) Provisional application No. 61/900,359, filed on Nov. 5, 2013.

(51) Int. Cl.
*H04L 12/18* (2006.01)
*H04L 12/26* (2006.01)
*H04L 12/733* (2013.01)
(Continued)

(52) U.S. Cl.
CPC ......... *H04L 12/18* (2013.01); *H04L 12/4633* (2013.01); *H04L 41/082* (2013.01); *H04L 41/12* (2013.01); *H04L 41/22* (2013.01); *H04L 43/0811* (2013.01); *H04L 43/50* (2013.01); *H04L 45/02* (2013.01); *H04L 45/20* (2013.01); *H04L 45/64* (2013.01); *H04L 49/201* (2013.01); *H04L 49/25* (2013.01); *H04L 61/2007* (2013.01); *H04L 61/2061* (2013.01); *H04L 61/6004* (2013.01); *H04L 69/22* (2013.01); *H04L 61/103* (2013.01)

(58) Field of Classification Search
CPC ..... H04L 49/25; H04L 12/18; H04L 49/201; H04L 41/12; H04L 12/4679; H04L 61/2007; H04L 41/0816; H04L 43/50; H04L 45/20; H04L 43/0811; H04L 45/02; H04L 41/082; H04L 41/22; H04L 45/64; H04L 61/2061; H04L 69/22; H04L 61/6004; H04L 41/0659; H04L 61/103
See application file for complete search history.

(56) References Cited

U.S. PATENT DOCUMENTS

2005/0083835 A1* 4/2005 Prairie ................ H04L 43/0811 370/224
2006/0221950 A1* 10/2006 Heer .................... H04L 12/467 370/389

(Continued)

*Primary Examiner* — Noel Beharry
*Assistant Examiner* — Ruihua Zhang
(74) *Attorney, Agent, or Firm* — Polsinelli PC

(57) ABSTRACT

Systems, methods, and non-transitory computer-readable storage media for a miscabling detection protocol. One or more switches can periodically send miscabling protocol (MCP) packets on non-fabric ports on all configured EPG VLANs. A first switch located at a network fabric receives a miscabling protocol (MCP) packet indicating an identity of an originating switch and a port number of an originating port of the MCP packet via a receiving port on the first switch, wherein the MCP packet is received from an external network connected to the receiving port, and wherein the originating switch and originating port are also located at the network fabric and connected to the external network. Based on the MCP packet, the first switch then detects a loop between the receiving port, the originating port, and the external network. Next, the first switch blocks the receiving port or the originating port in response to detecting the loop.

25 Claims, 9 Drawing Sheets

(51) Int. Cl.
*H04L 12/24* (2006.01)
*H04L 12/751* (2013.01)
*H04L 12/947* (2013.01)
*H04L 12/931* (2013.01)
*H04L 12/715* (2013.01)
*H04L 29/12* (2006.01)
*H04L 29/06* (2006.01)
*H04L 12/46* (2006.01)

(56) References Cited

U.S. PATENT DOCUMENTS

| | | | | |
|---|---|---|---|---|
| 2007/0171814 A1* | 7/2007 | Florit | ................... | H04L 12/437 370/216 |
| 2007/0183337 A1* | 8/2007 | Cashman | ................ | H04L 41/06 370/250 |
| 2009/0238196 A1* | 9/2009 | Ukita | ................... | H04L 12/5695 370/408 |
| 2013/0227689 A1* | 8/2013 | Pietrowicz | ............... | G01R 1/20 726/23 |
| 2013/0276129 A1* | 10/2013 | Nelson | ............... | H04N 21/8133 726/26 |
| 2015/0016277 A1* | 1/2015 | Smith | ................. | H04L 41/0686 370/244 |
| 2015/0124823 A1* | 5/2015 | Pani | ....................... | H04L 12/18 370/392 |
| 2015/0127701 A1* | 5/2015 | Chu | ........................ | H04L 45/22 709/201 |

* cited by examiner

MISCABLING DETECTION PROTOCOL

RELATED APPLICATIONS

This application claims priority to U.S. Provisional Patent Application No. 61/900,359, filed on Nov. 5, 2013, the content of which is incorporated herein by reference in its entirety.

TECHNICAL FIELD

The present technology pertains to network loops, and more specifically pertains to a miscabling protocol for detecting network loops.

BACKGROUND

The soaring demand for network data throughout the globe has steadily fueled the evolution of networking technologies, as engineers and manufacturers rush to keep pace with the changing data consumption landscape and increasing network scalability requirements. Various network technologies have been developed precisely to meet this soaring demand for network data. For example, overlay network solutions, such as virtual extensible local area networks (VXLANs), as well as virtualization and cloud computing technologies, have been widely implemented in networks with increasing success as popular solutions to such growing demands for network data.

However, while this advancement in network technologies has allowed networks to support such increased demand for network data, it has also resulted in larger and more complex networks, involving massive amounts of traffic data constantly being routed through the network. And as the amount of traffic handled by the network grows, it becomes increasingly important to ensure efficient and error-free routing strategies. Precisely, poor routing strategies can create an enormous burden on the network, which only worsens as the amount of traffic grows, and can result in inefficient and costly traffic routing, as well as routing errors, such as route flaps and network loops. Not surprisingly, proper cabling and switching configurations are also important for handling large amounts of traffic, as they can help increase network efficiency and prevent errors, such as network loops. Unfortunately, as the complexity of the network grows, it becomes increasingly difficult to manage the various cabling, switch, and router configurations in the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
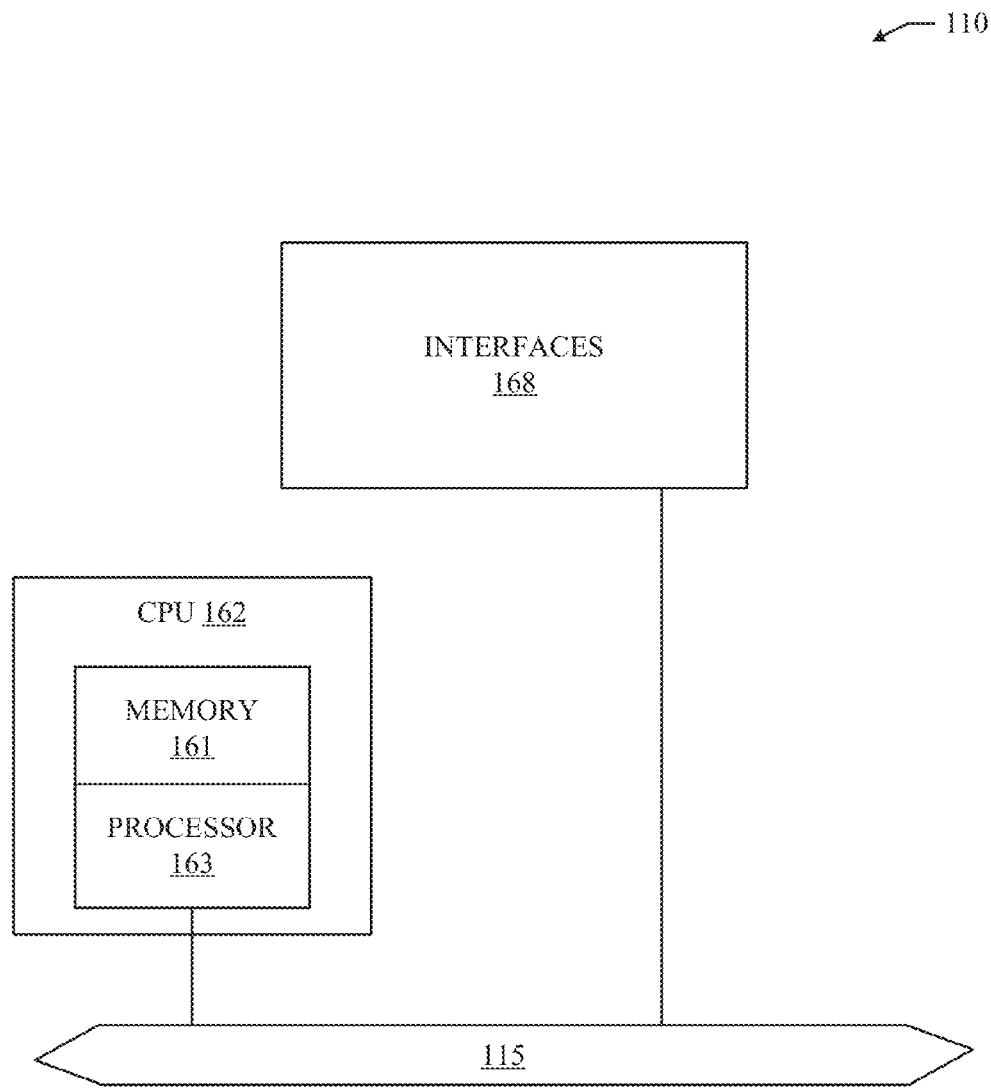
FIG. 1 illustrates an example network device, according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

As previously mentioned, improper cabling, switch, and router configurations can have harmful and even devastating effects on a network. For example, improper cabling or port configurations in a network can result in a layer 2 forwarding loop being formed in the network. A loop in the network can severely undermine and often cripple the network. In some cases, depending on the external connection, a loop can even create a fatal meltdown in the network. Moreover, a network can be particularly susceptible to a fatal meltdown when broadcast or multicast messages are transmitted through links that are connected into a loop. Yet as new, larger networks and more complex configurations are implemented in a network environment, error detection and correction, such as loop detection and correction, become a significant challenge for network engineers.

Unfortunately, however, current solutions fail to provide adequate prevention against improper cabling and port configurations, particularly on larger, more complex environments, and lack effective mechanisms for intelligently and dynamically detecting such miscabling and improper port configurations. Thus, it would be advantageous to implement a mechanism that allows for intelligent and efficient detection and correction of miscabling and improper port configurations, to prevent the damaging consequences of network loops.

The approaches set forth herein can be implemented to address the foregoing issues, for example, by detecting a loop in a network and performing a corrective action, such as blocking or re-configuring one or more links in the loop. Specifically, these approaches can be used to implement a miscabling protocol in the fabric. The miscabling protocol can ascertain which front panel port(s) (i.e., non-fabric port(s)) is connected to another front panel port in the same flood domain, such that both front panel ports are improperly configured in a loop in the bridge domain.

There are various configurations or scenarios which can result in a network loop. For example, if the ports are directly connected to each other, this can create a loop with a potential meltdown scenario, where any packet egressing on one of the ports will loop forever. If it is a multicast or broadcast packet, it can exponentially increase the load on the network, as each time the packet loops, the packet will create multiple copies of itself which are sent to the rest of the flood domain.

Another configuration or scenario can result in a loop if the ports are inter-connected by a layer 2 (L2) network which is running spanning tree protocol (STP). Here, one of the ports would likely be blocked by STP. The fabric would forward bridge protocol data units (BPDUs) through spine switches, and thus the STP-aware external L2 switches will discover the fabric as an L2 link. STP would likely block the ports in this scenario to break the loop. The topology here would look like a triangle formed between the inter-connected ports and the L2 network.

Finally, the next scenario can result in a problematic configuration case, or even a meltdown. For example, if two ports in the fabric, say port 1 ("P1") and port 2 ("P2"), are connected to an external L2 network and marked to be part of different endpoint groups (EPGs) or virtual LANs (VLANs), but actually belong to the same bridge domain (BD), yet from the L2 network side, these ports are part of the same VLAN, this configuration would result in a loop and STP would not work to break such loop. STP BPDUs would be flooded over a specific EPG-VLAN, but not the BD. Because STP BPDUs do not cross EPG-VLANs, the L2 network switches will not discover any BPDU sent on one port (with that port's EPG-VLAN) over the other port. As such, the L2 network will keep the ports in forward state (MCP_FWD state). Yet from the fabric's point of view, both of these ports are part of the same flood domain (i.e., same BD). Thus, the classic L2 loop will be formed, as discussed above.

Disclosed are systems, methods, and non-transitory computer-readable storage media for implementing a miscabling protocol in overlay networks. As follows, a method of the subject technology is described with respect to a system performing steps for loop detection. Here, the system can refer to a device, such as a network device, including a switch, as described further below.

The system receives a miscabling protocol (MCP) packet indicating an identity of an originating switch and a port number of an originating port of the MCP packet. The system receives the MCP packet via a receiving port on the system.

The system and originating switch can be located on the same network fabric and connected to the same external network. For example, the system and originating switch can be leaf switches in the fabric. Moreover, the system and originating switch can be top-of-rack (ToR) switches. In some embodiments, the external network is an L2 network.

Based on the MCP packet, the system detects identifies a loop between the receiving port, the originating port, and the external network. The system can detect the loop based on a receipt of the MCP packet, as the MCP packet is not intended to return to the fabric after it leaves the originating port. The originating port can be a non-fabric port configured to periodically send the MCP packets to a multicast address, such as an MCP or STP multicast address. In some cases, the system and/or the originating switch can be configured to send an MCP packet for each configured EPG or VLAN.

When receiving the MCP packet, the system can extract the identity of the originating switch and the port number to determine that a loop does indeed exist. Here, the system can use that information to determine that another switch in the fabric sent the MCP packet, and the MCP packet looped back from an external network back to the fabric.

Next, the system can block the receiving port and/or the originating port in response to detecting the loop. In some cases, the system can use the identity and port number in the MCP packet to determine which port should be blocked. For example, the system can check if it should block the receiving port, and make a determination based on a priority of the originating switch and port vis-à-vis the system and receiving port. The system can determine priorities based on the respective addresses of the switches, such as the IP addresses of the system and originating switch, as well as the port numbers of the originating and receiving ports. In some cases, the switch and port with the higher IP address can be blocked over the switch and port with the lower IP address. For example, if the system receives the MCP packet from an originating switch that has a lower IP address, as determined based on the MCP packet, the system would then block its receiving port.

To break the loop, the system administrator ("sys admin") can correct the miscabling or shut the trouble port off through a shut command. Alternatively, the system can block the port to prevent traffic being forwarded into a loop, and thus break the loop. Here, the port can be set to a block state. However, in some cases, the port can be placed in a state were traffic is blocked with some exemptions. Exemptions can be provided for certain types of traffic, such as MCP or STP traffic, for example. In some cases, the blocked port can be restored to a forwarding state after a timeout period of time, which can be a configuration parameter, or an explicit command from the sys admin.

By detecting and breaking loops between the leaf or ToR switches in the fabric and the external network, the miscabling protocol can help prevent, detect, and correct loops in overlay networks, such as VXLANs.

DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for accurate and efficient detection of network loops in a network, such as an overlay network and a network fabric. Disclosed are systems, methods, and computer-readable storage media for a miscabling detection protocol. A brief introductory description of exemplary systems and networks, as illustrated in FIGS. 1 through 4, is disclosed herein. A detailed description of miscabling protocol, related concepts, and exemplary variations, will then follow. These variations shall be described herein as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2B:
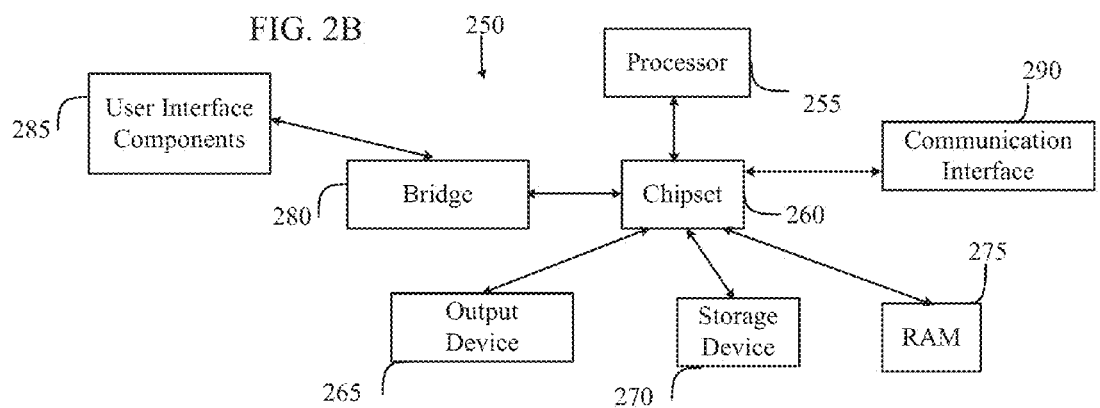
FIGS. 2A and 2B illustrate example system embodiments.
Figure 2A:
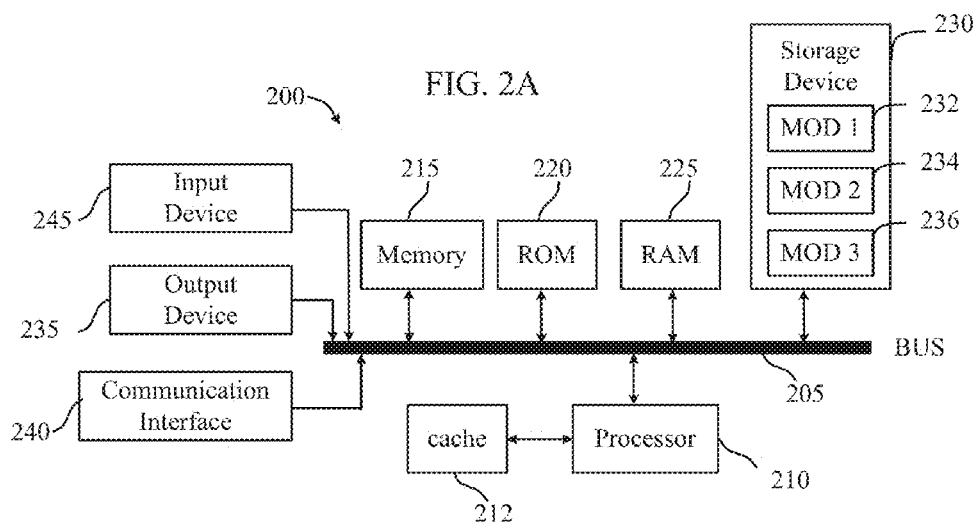

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
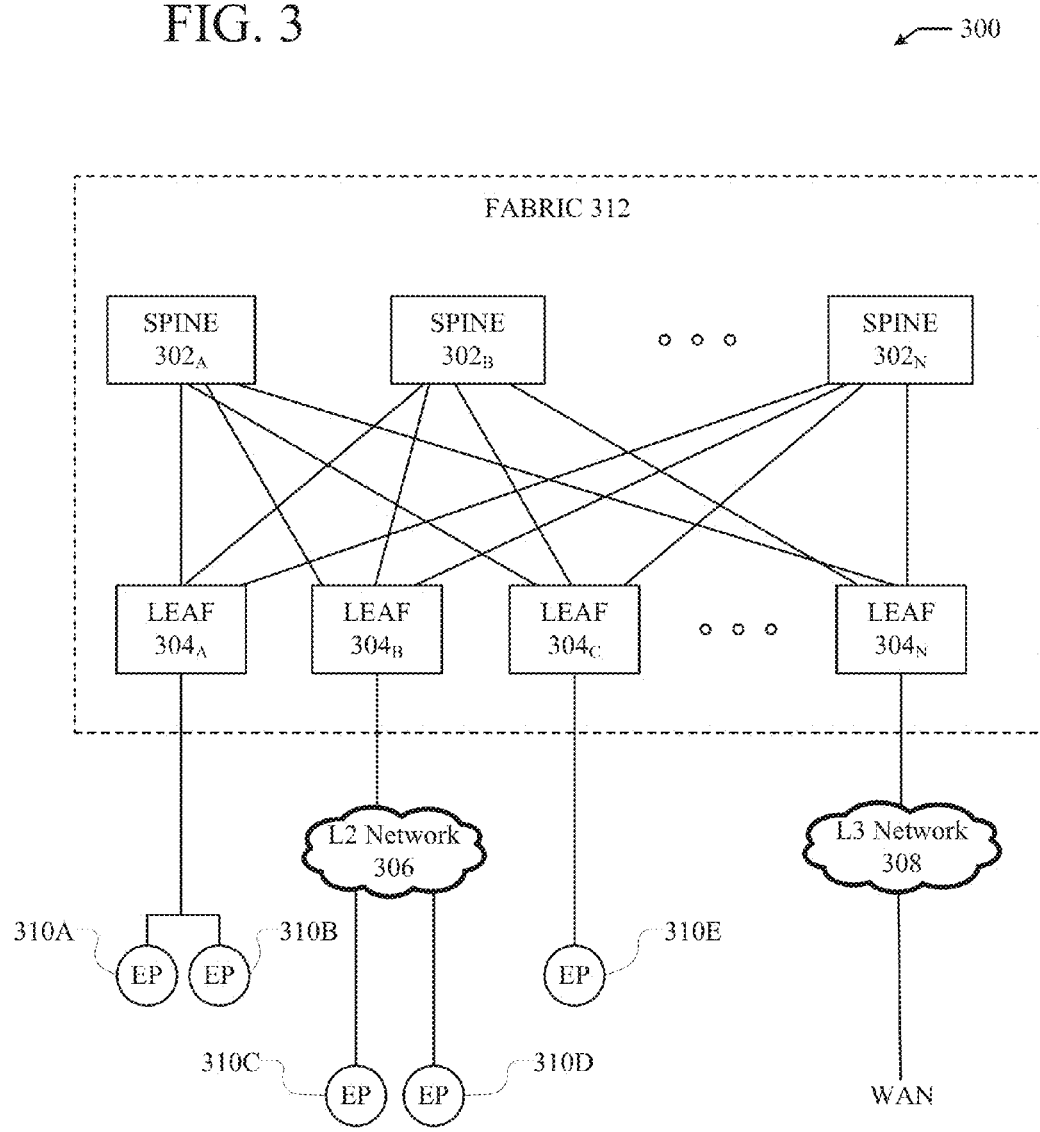
FIG. 3 illustrates a schematic block diagram of an example architecture for a network fabric.

FIG. 3 illustrates a schematic block diagram of an example architecture 300 for a network fabric 312. The network fabric 312 can include spine switches 302A, 302B, . . . , 302C (collectively "302") connected to leaf switches 304A, 304B, 304C, . . . , 304D (collectively "304") in the network fabric 312.

Spine switches 302 can be Layer 3 ("L3") switches in the fabric 312. However, in some cases, the spine switches 302 can also, or otherwise, perform Layer 2 ("L2") functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect endpoint groups ("EPGs") to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, etc. In some cases, the endpoints 310 can include a server or switch configured with a virtual tunnel endpoint functionality which connects an overlay network, such as overlay network 400 below, with the fabric 312. For example, in some cases, the endpoints 310 can represent the virtual tunnel endpoints 408A-D illustrated in FIG. 4. The overlay network can host physical devices, such as servers, applications, EPGs, virtual segments, virtual workloads, etc. Likewise, endpoints 310 can also host virtual workloads and applications, which can connect with the fabric 312 or any other device or network, including an external network.

Figure 4:
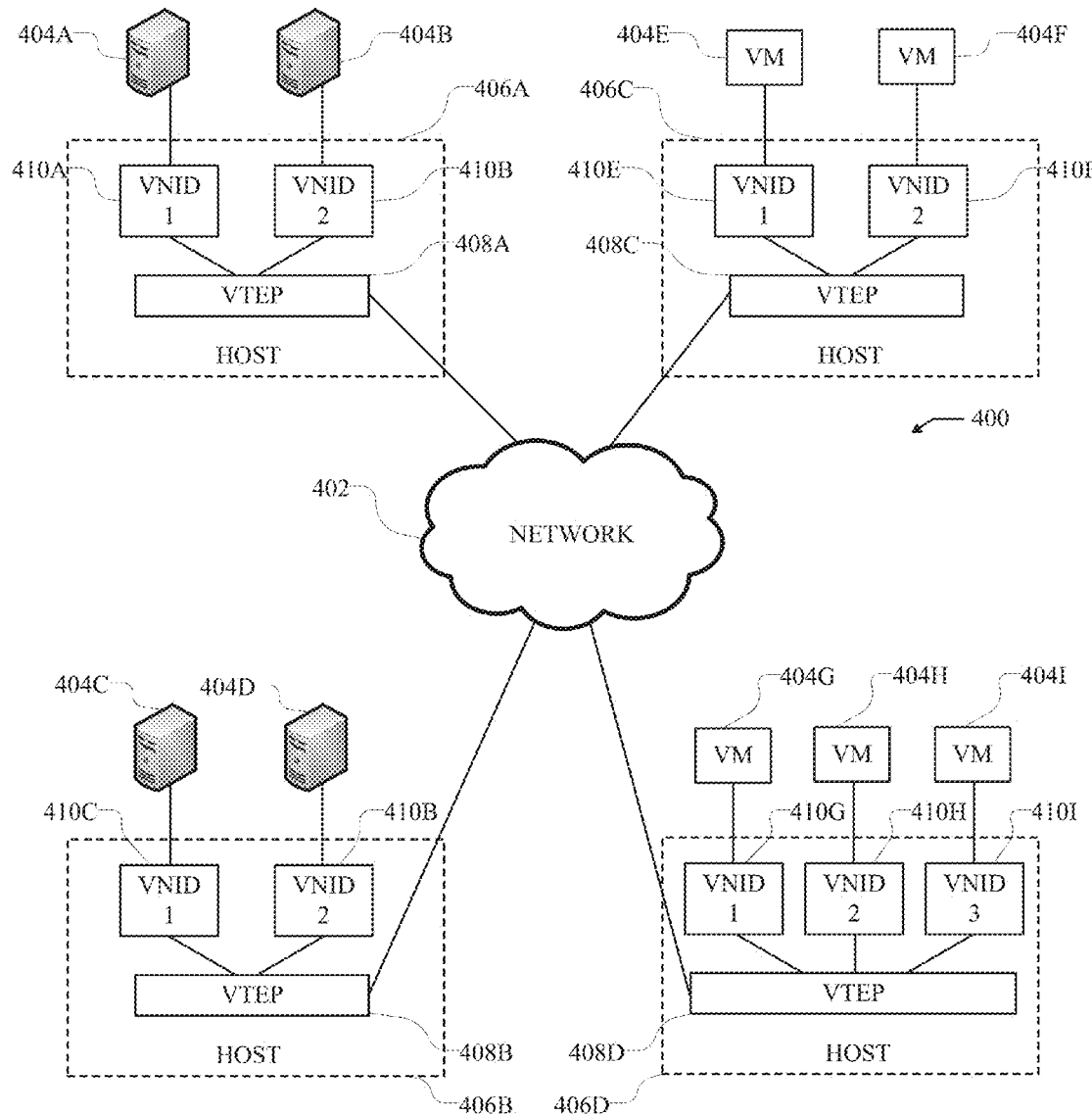
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include any packet network, such as an IP network, for example. Moreover, hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. In some embodiments, network 400 can be a VXLAN network, and VTEPs 408A-D can be VXLAN tunnel end points.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Endpoints and VMs 404A-I can connect to their respective VNID or virtual segment, and communicate with other endpoints or VMs residing in the same VNID or virtual segment. For example, endpoint 404A can communicate with endpoint 404C and VMs 404E, G because they all reside in the same VNID, namely, VNID 1. Similarly, endpoint 404B can communicate with VMs 404F, H because they all reside in VNID 2.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5:
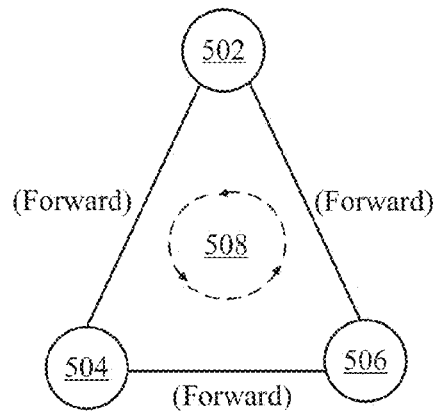
FIG. 5 illustrates an example network loop.

FIG. 5 illustrates an example configuration 500 of a network loop 508. The network loop 508 can flow through ports 502-506. The network loop 508 can be a traditional L2 loop or forwarding loop. The loop 508 can be the result of a miscabling error and/or a bad configuration on the ports 502-506. Thus, the loop 508 will continue until the cabling is corrected, one of the ports 502-506 is blocked, or otherwise when the network is crippled or reconfigured.

In particular, the loop 508 is created when a packet is transmitted on one of the ports 502-506 and forwarded throughout the ports 502-506 in a loop. For example, if the ports 502-506 are interconnected and all are set to forwarding mode, the packet will continue to be forwarded throughout the ports 502-506 in a loop.

If a broadcast or multicast packet is transmitted by one of the ports 502, the traffic generated by the loop 508 can cripple the network and result in a meltdown scenario. Here, the broadcast or multicast packet will exponentially increase the load on the network by creating multiple copies of itself each time the packet loops. Eventually, the load may overburden the network causing a fatal meltdown of the network.

The ports 502-506 can reside on one or more switches. The switches can include physical switches, such as ToRs, and/or virtual switches, such as software switches or a hypervisor running a VTEP function. Moreover, the switches can reside on one or more networks, including L2 networks, VLANs, EPGs, overlay networks, L3 networks, etc.

If the ports 502-506 reside on the same device, the loop 508 can be a self-loop resulting from a packet looping among the ports 502-506 on the same device. Here, the loop 508 can be corrected by blocking one of the ports 502-506, reconfiguring the device, and/or reconfiguring one or more ports 502-506.

Figure 6:
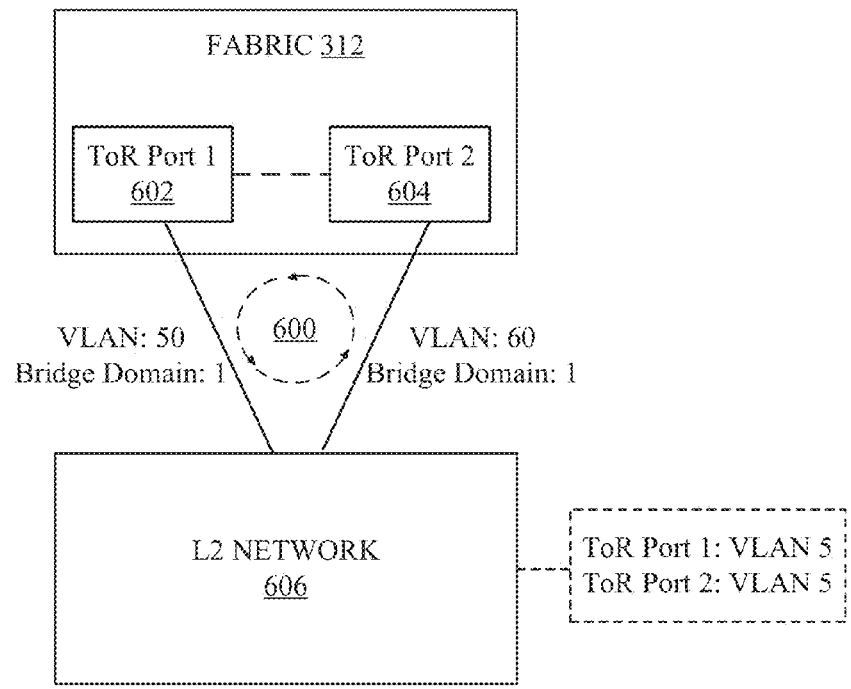
FIG. 6 illustrates an example loop between a fabric and a layer 2 network.

FIG. 6 illustrates an example loop 600 between a fabric 312 and an L2 network 306. The fabric 312 can include one or more ToR switches hosting ToR ports 1 and 2 (602, 604). ToR ports 1 and 2 (602, 604) can connect the fabric 312 to L2 network 306. Moreover, the ToR ports 1 and 2 (602, 604) can be interconnected through L2 network 306. This interconnection between ToR ports 1 and 2 (602, 604), through L2 network 306, can result in a loop 600. In particular, loop 600 can form when the connections to the L2 network 306 on ToR ports 1 and 2 (602, 604) are set to belong to the same bridge domain ("BD") but different VLANs or EPGs, while the ToR ports 1 and 2 (602, 604) are marked on the L2 network 306 as part of the same VLAN.

For example, if the L2 network 306 is configured on ToR port 1 (602) as being on VLAN 50 and BD 1, while the L2 network 306 is configured on ToR port 2 (604) as being on the same BD 1 but VLAN 60 (as opposed to VLAN 50), and ToR ports 1 and 2 (602, 604) are both marked on the L2 network 306 as being on VLAN 10, this can result in the loop 600. Here, ToR ports 1 and 2 would be interconnected by the L2 network 306 in a triangle such that packets will traverse the connection in a loop.

In such a case STP would not break the loop 600. STP BPDUs are flooded over a VLAN, but not through the BD. Because STP BPDUs do not cross different VLANs, the switches in the L2 network 306 will not discover any BPDUs sent on one port (with that ports vlan) over other ports. As such, the L2 network 306 will keep the ports in forwarding state (i.e., MCP_FWD state). However, from the point of view of the fabric 312, both ports are part of the same flood-domain (same BD). Thus, the loop 600 will be formed and packets egressed through one of the ToR ports 1 and 2 will be returned to the fabric through the L2 network 306.

To detect loop 600 in this scenario, the leaf switches on the fabric 312 can be configured to support a miscabling protocol that is instantiated on the non-fabric ports of leaf switches 304. Any miscabling or misconfiguration between spine switches 302 and leaf switches 304 can be handled by IFC discovery protocol. The miscabling protocol can be configured on the access layer switches, such as ToR/leaf switches, and implemented along with STP, which can be configured to run on external L2 switches.

With the miscabling protocol, the ToR switches (e.g., leaf switches 304) can be configured to periodically send out a miscabling protocol packet ("MCP") on non-fabric ports. The MCP can be sent for each configured EPG-VLAN. The ToR switches can be then configured to detect a loop anytime an MCP ingresses on one of their ports by analyzing the content of the MCP.

The miscabling protocol packet data unit (PDU) can be an L2 packet sent to a multicast address, such as a CDP or STP multicast address. The MCP can be an LLC-SNAP encapsulation with a new SAP type. Each ToR switch can be responsible for sending out MCPs with a configurable periodicity or according to a specific interval or schedule.

When a port is inited, it goes in MCP forwarding state (MCP_FWD state). The payload of the MCP can contain the identity of the originating ToR switch, such as the address of the ToR switch; the port number of the originating ToR switch; a timestamp; and/or a checksum, such as MD-5 or SHA-1 checksum, which can be based on a pre-shared key. In some cases, to support the control plane overhead, the ToR switches can use hardware assist when generating MCP packets.

A ToR switch should not see any MCP packets ingressed from its ports, as this indicates a loop. In some cases, when receiving an MCP, the receiving ToR switch can first use the configured pre-shared key to derive the checksum and verify whether it matches the checksum received in the packet to determine if the packet is an attack packet or an authentic packet. If the MCP is not a valid packet, as determined by the checksum, the ToR can silently drop it. In some cases, the ToR switch can also generate a syslog message. The message can alert IFC of a possible (malicious) attack.

Next, the ToR switch can check if the time stamp is within a threshold amount of time. If the time stamp is not in an acceptable window of time (e.g., current time stamp at the received ToR with a difference of x seconds above a configured threshold), then the packet can also be dropped and IFC alerted of a possible replay attack.

If both the checksum and time stamp checks pass, the ToR switch can determine whether it should block the receiving port or the sending port. In some embodiments, the switch determines which port to block by comparing priorities and/or identities associated with the receiving and sending switches. For example, the receiving ToR switch can check if the originating switch has lower IP address than the receiving ToR switch. If so, the receiving ToR switch can block the port on which the packet ingressed. Alternatively, the sending ToR switch can block the sending port where the packet egressed. This can be achieved by having the receiving switch send a message to the originating switch about the miscabling or loop detected. This can otherwise be achieved when the roles of the switches change. For example, when the current receiver switch originates its own MCP packet and the previous sending switch receives this MCP packet, at that point the previous sending switch can block the ingress port.

If the originating switch identity matches the receiving switch's identity (self-loop), then the switch can check if the port number of the packet is less than or equal to the port number on which the packet was received. If so, the ingress port can be blocked (error-disabled) and is not allowed to send or receive any user traffic. However, in some cases, the ingress port can be set to allow certain types of traffic, such as MCP or STP packets, for example. An admin shut/no-shut will clear the port state to forwarding, MCP_FWD state.

The miscabling protocol can also help prevent, detect, and correct loops in an overlay network, such as a VXLAN network. For example, if ToR ports 1 and/or 2 are connected to an overlay network, such as overlay network 400, the miscabling protocol can prevent ToR ports 1 and/or 2 from forwarding traffic to VLANs in the overlay network that belong to the BD. Blocking one of the ToR ports in the loop can ensure that traffic in the overlay network is not continuously forwarded in a loop. This can particularly help an overlay network which cannot use STP to break any loops.

Figure 7:
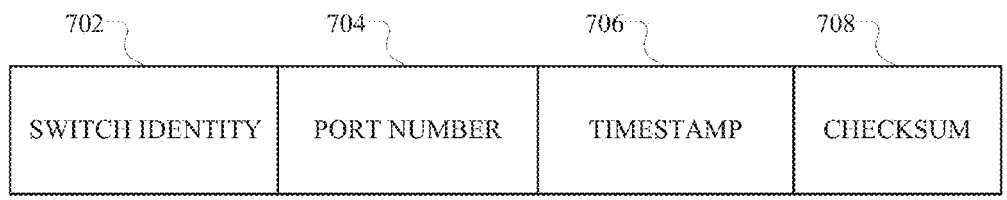
FIG. 7 illustrates an example miscabling protocol packet.

Referring now to FIG. 7, an example miscabling protocol packet (MCP) 700 can include a switch identity 702 and port number 704. The switch identity can refer to the identity of the originating switch, which has generated and transmitted the MCP. The identity can include an IP address, such as a loopback IP address. However, in some embodiments, the identity 702 can be the switch's MAC address, hardware address, or any other address and/or identifying string.

Similarly, the port number 704 can refer to the originating port number on the originating switch. The MCP 700 can also include a timestamp 706, which can indicate when the MCP was generated and/or transmitted. This way, a receiving switch can compare the timestamp 706 with the time of receipt to determine if the packet was sent as part of an attack, such as a replay attack.

The MCP 700 can also include a checksum 708. The checksum can be created based on a pre-shared key, which allows the receiving device to use the pre-shared key to verify the checksum. The checksum 708 can be based on a checksum function or algorithm. In some cases, the checksum 708 can be an MD5 checksum. In other embodiments, the checksum 708 can be a SHA checksum, such as a SHA1 checksum. However, as one of ordinary skill in the art will readily recognize, the checksum 708 can be based on any other checksum function or algorithm, including those currently available and any available in the future.

In some embodiments, the MCP 700 can also include more or less fields or portions of information. For example, in some cases, the MCP 700 can include a second identity, such as a second address; network information; protocol information; a flag, such as a VLAN flag; etc. The examples provided above are for illustration purposes. Other embodiments are contemplated herein.

Figure 8A:
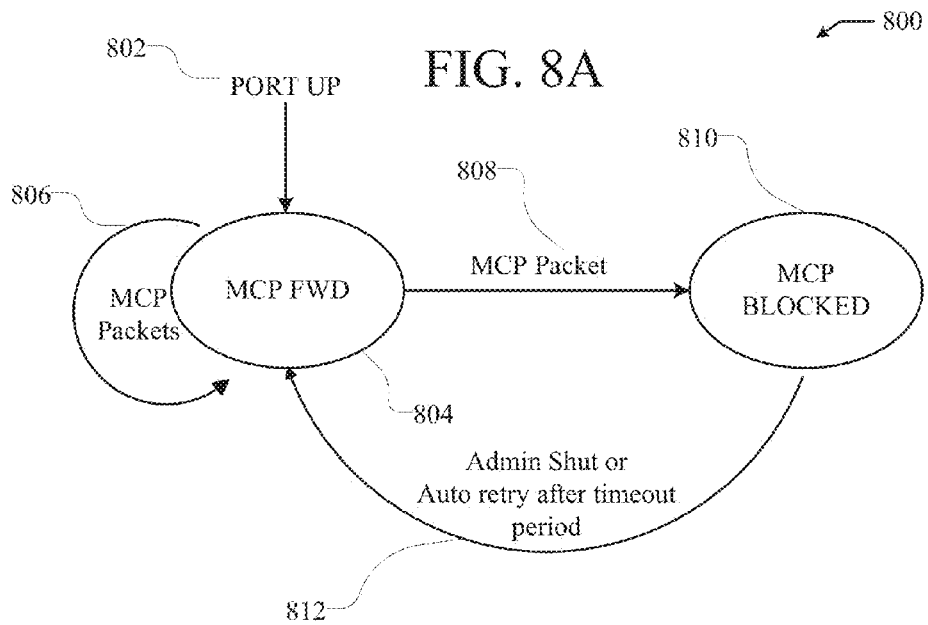
FIG. 8A illustrates an example port operation in non-strict mode.

FIG. 8A illustrates an example port operation 800 in non-strict mode. A port can first receive a port up command 802 to place the port on forwarding mode 804. The port can be a non-fabric port on a fabric network, such as fabric 312. For example, the port can be a non-fabric port on a leaf switch 304, on the fabric 312.

While in forwarding mode 804, the port can forward packets it receives that are not destined for port. For example, MCP packets can be sent to a multicast address, such as an MCP or STP multicast address. Thus, if port receives a packet addressed to the multicast address, it can automatically forward the packet based on a determination that the port is not the intended recipient.

When up, the port can also send periodic MCP packets 806 as part of the miscabling protocol for detecting loops. Here, the periods for sending the MCP packets can be based on a configuration parameter, a schedule, an event, etc. The periodic MCP packets can allow the ToR switches to continuously check for loops. Since the MCP packets are transmitted to a multicast address, ToR switches should not receive any MCP packets on its ports unless a loop exists. Thus, if a port on a ToR switch receives an MCP packet, the ToR switch can assume or ascertain that the MCP packet was received as a result of a forwarding loop. This can mean that an originating ToR switch transmitted the MCP packet from one of its non-fabric ports, and the MCP packet was forwarded until it was later returned to a ToR switch in the fabric 312, including the originating ToR switch and/or any other ToR switch.

As previously suggested, if the port receives an MCP packet 808, it can be set to a blocked state 810 to prevent the port from forwarding traffic in a loop in the network. In some embodiments, the receiving port is set to a blocked state 810 when it receives an MCP packet 808 from an originating switch and port having a lower identity than that of the receiving switch and port. In other embodiments, the originating switch can block the originating port when the receiving switch and port have a lower identity than that of the originating port and switch.

To perform the comparison of identities, the receiving switch can extract the identity of the originating switch from the MCP packet 808, and compare the identity of the originating switch with the identity of the receiving switch to determine whether it should be set to block. The identity of a switch can be based on the address of the switch, such as the IP or MAC address of the switch; the port number of the switch; the network associated with the switch, such as the VLAN of the switch or the subnet of the switch; the hardware address of the switch; etc. In some embodiments, the identity is determined based on the IP address of the switch. In other embodiments, the identity is determined based on a combination of the address, such as the IP address, and the port number of the switch.

While the port is in the blocked state 810, the switch can bring the port back up in response to a shut/no-shut command. For example, the sys admin can set a shut/no-shut command to bring the port back up from the blocking state 810 to the forwarding state 804. If auto retry is enabled, the port can go back to forwarding state 804 after a timeout period 812. The timeout period can be a predetermined period of time defined in a configuration parameter. The timeout period can also be based on a default period configured on the switch. In some embodiments, the timeout period can be set via a timeout command, which can trump or modify the default timeout period set for the auto retry.

After the timeout period 812, the port can return to forwarding state 804 and continue sending periodic MCP packets 806. The port can also continue listening for MCP packets.

If during the port-up state, without checking for a loop, the port is allowed to be in forward state (MCP_FWD) and there is actually a loop and a broadcast stream is injected into the loop, this could potentially result in a partial meltdown in the BD. To avoid this scenario, the port can be operated in strict mode.

Figure 8B:
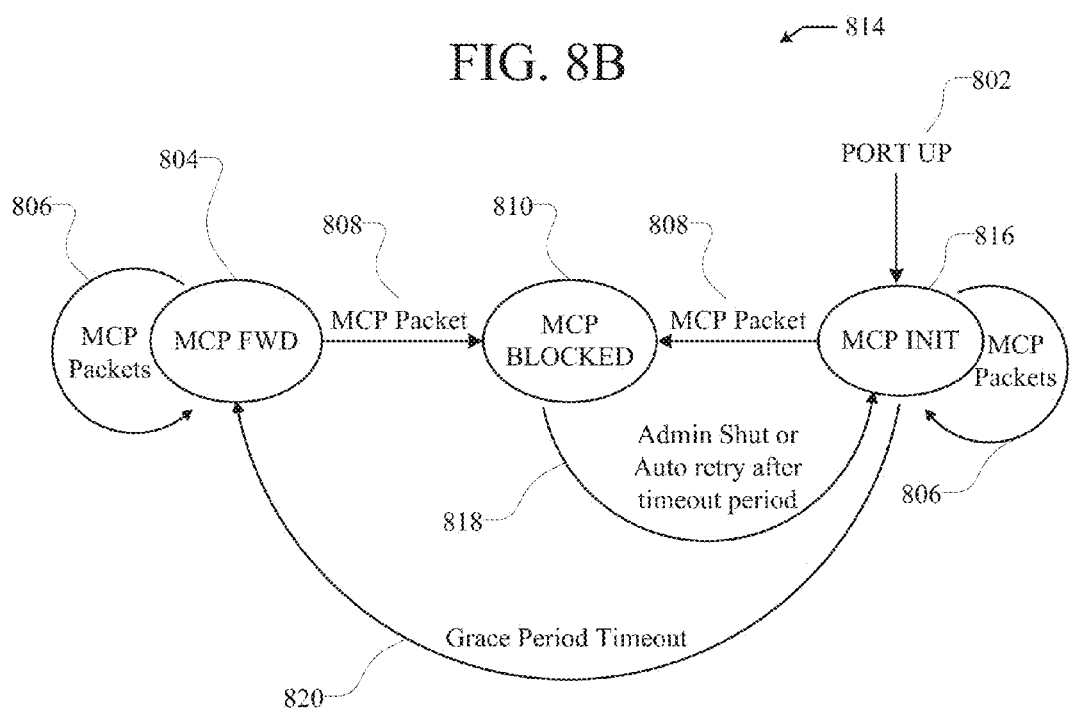
FIG. 8B illustrates an example port operation in strict mode.

Referring to FIG. 8B, a port operation 814 in strict mode can be implemented to bring the port up 802 after a blocked state 810 in a default mode 816 (MCP_INIT) where only certain types of packets are forwarded and all other packets are dropped. In other words, the port in default mode 816 can block all traffic with some exemptions for specific types of traffic. In some embodiments, the default mode 816 blocks all user traffic but allows MCP packets and STP packets. In other embodiments, the default mode 816 can include additional exemptions. For example, the port may allow other types of control plane packets.

During the default mode 816, the port can continue to send periodic MCP packets 806. Moreover, if the port receives an MCP packet 808 while in default mode 816, it can return to the blocked state 810. During the blocked state 810, the port can then return to the default mode 816 after a timeout period 818 passes, if the port is configured with auto retry. Alternatively, a shut/no-shut command can be used to set the port from blocked state 810 to the default mode 816.

In the strict mode of operation, the port may only be allowed to move to forwarding state 804 after a grace period timeout 820. The grace period can be a configured value set by the switch or the system administrator. The grace period can also be modified by the administrator at any point. Moreover, the grace period can be configured based on one or more factors, such as size of the network, amount of traffic, characteristics of the loop, characteristics of the switch or port, time of day, type of error, etc.

At any time, the port can also be modified to move to port operation 800 in non-strict mode or port operation 814 in strict mode. Thus, the mode of the port can be modified based on the circumstances and any other factors.

Figure 9:
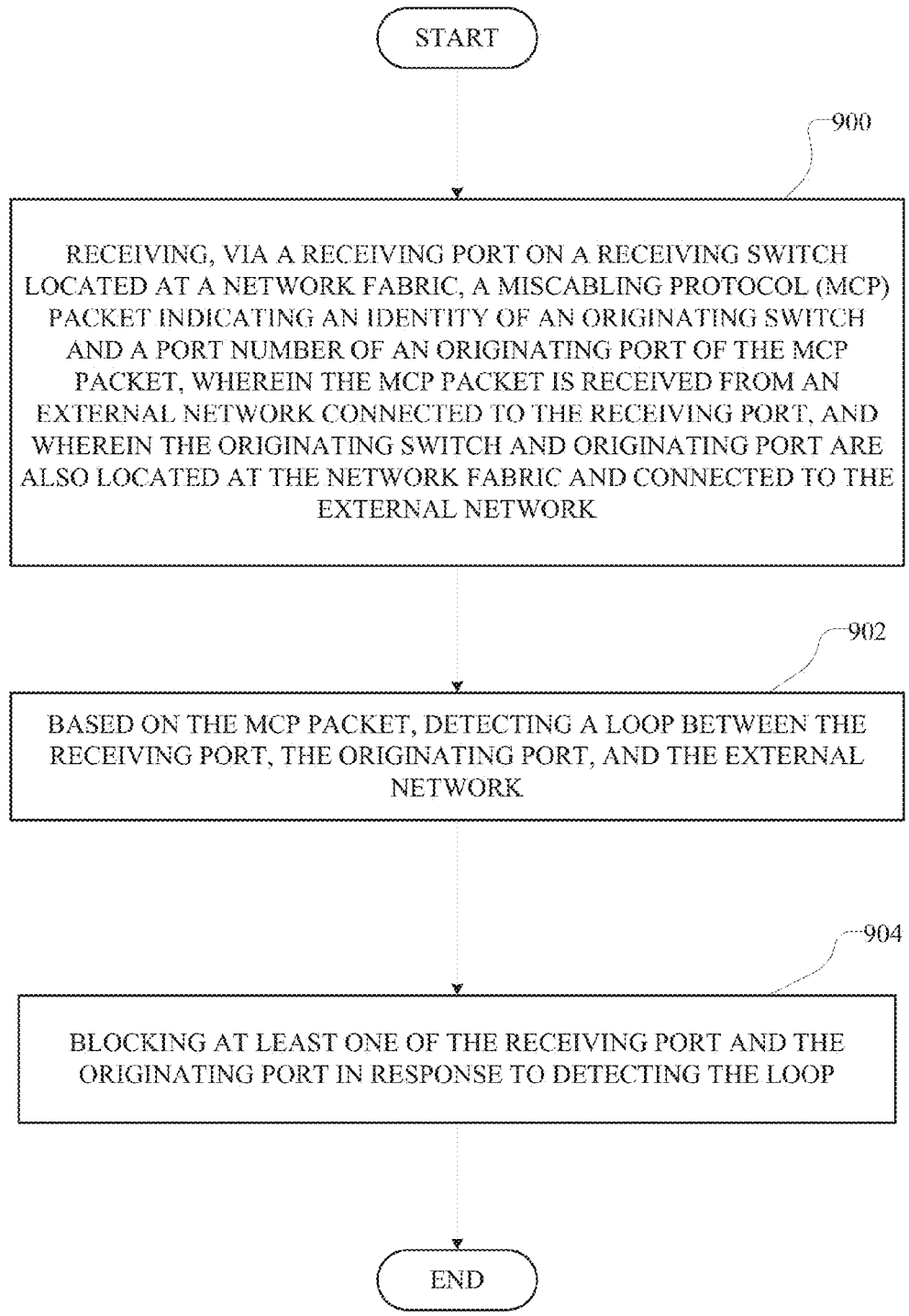
FIG. 9 illustrates a first example method embodiment.
Figure 10:
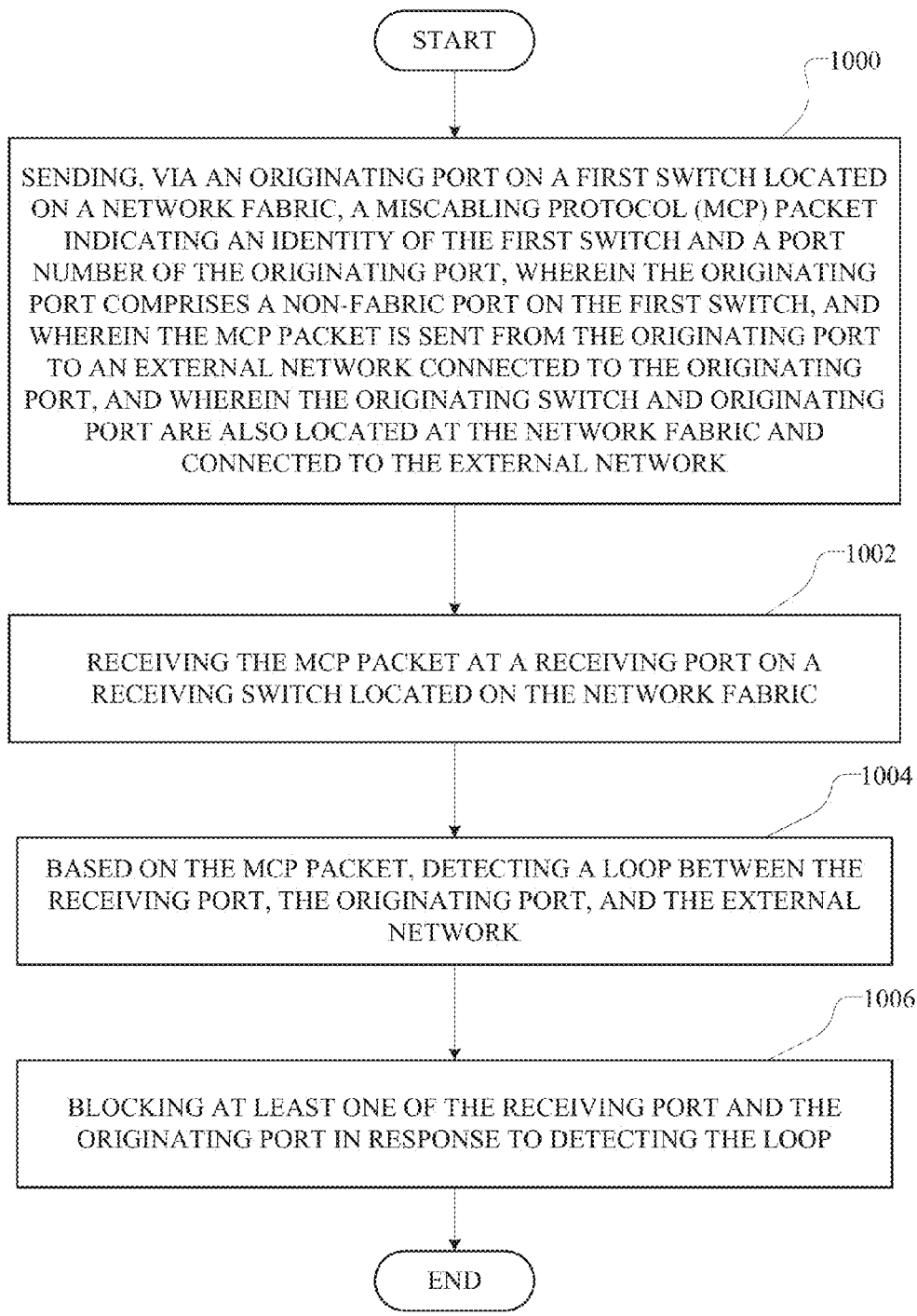
FIG. 10 illustrates a second example method embodiment.

Having disclosed some basic system components and concepts, the disclosure now turns to the exemplary method embodiments shown in FIGS. 9 and 10. For the sake of clarity, the methods are described in terms of a system 110, as shown in FIG. 1, configured to practice the methods. The steps outlined herein are exemplary and can be implemented in any combination thereof, including combinations that exclude, add, or modify certain steps.

FIG. 9 illustrates a first example method embodiment. Here, the system 110 receives, via a receiving port on the system 110, a miscabling protocol packet indicating an identity of an originating switch and a port number of an originating port associated with the miscabling protocol packet, wherein the miscabling protocol packet is received from an external network connected to the receiving port and the originating port, and wherein the system 110 and originating switch are located on the same network fabric (900).

The external network can be an L2 network marked as part of the same bridge domain on the system 110 and the originating switch. However, the system 110 and originating switch can have the external network marked as different EPGs-VLANs. On the other hand, the external network can have the receiving port and originating port marked or configured as part of the same VLAN. This can create a loop between the external network, the originating port, and the receiving port. For example, the originating and receiving ports can flood the external network with broadcast or multicast traffic because they both see the external network as belonging to the same BD. The external network, in turn, may forward the traffic to both the receiving and originating ports as it sees both ports as part of the same VLAN.

The originating and receiving switches can be leaf switches 304 in fabric 312. Moreover, the switches can be ToR switches. Moreover, the originating and receiving switches can be configured to listen for MCP packets, as well as transmit periodic MCP packets.

Next, the system 110 detects a loop between the receiving port, the originating port, and the external network based on the miscabling protocol packet (902). In some cases, the miscabling protocol packet is addressed to a multicast address, such as an MCP multicast address or an STP multicast address. Here, because MCP packets are sent by leaf or ToR switches in the fabric and addressed to a multicast address, the system 110 can determine that a loop exists by the fact that it has received an MCP packet. This can be because MCP packets are not supposed to be received by the leaf or ToR switches in the fabric from the external network.

In response to detecting the loop, the system 110 then blocks the receiving port or the originating port. The system 110 can block one of the ports based on a priority associated with the ports and/or their corresponding switches. For example, the system 110 can compare the identity of the receiving port and switch with the identity of the originating port and switch, and determine which port to block based on a priority determined by comparing the identities. To illustrate, the system 110 can extract the originating switch's IP address and port number from the MCP packet, and compare that with the IP address of the system 110 and the port number of the receiving port. The port and switch with the higher IP address and port number can then be set to blocked state while the switch and port with the lower IP address and port number can remain in forwarding state.

When setting a port to blocking state, the system 110 can use a non-strict mode or a strict mode. In the non-strict mode the port is blocked and can be automatically returned to forwarding state after a timeout period or a shut/no-shut command. On the other hand, in the strict mode, the port can be blocked and, after the timeout period, instead of returning to forwarding mode, it can be set to a default mode that only allows certain types of traffic, such as MCP or STP traffic, for example.

In some cases, the MCP packet can also include one or more additional fields. For example, the MCP packet can include a timestamp and/or a checksum value. The timestamp can be used to verify that the MCP packet was not part of an attack, such as a replay attack. Similarly, the checksum can be used to verify that the MCP packet is authentic and not part of a malicious attack. The system 110 can use a pre-shared key used to generate the checksum to verify the checksum. The checksum can be generated by a checksum function or algorithm, such as MD-5 or SHA-1, as one of ordinary skill in the art will readily understand.

FIG. 10 illustrates a second method embodiment. Here, the system 110 is located on a network fabric and first sends, via an originating port on the system 110, an MCP packet indicating an identity of the system 110 and a port number of the originating port, wherein the originating port is a non-fabric port on the system 110, and wherein the MCP packet is sent from the originating port to an external network connected to the originating port, and wherein the originating switch and originating port are also located at the network fabric and connected to the external network (1000). Here, the network fabric can be fabric 312 illustrated in FIG. 3, and the system 110 can be a leaf switch 304, as illustrated in FIG. 3. The external network can be, for example, an L2 network, such as L2 network 306 illustrated in FIG. 3.

In some embodiments, the system 110 can generate and/or send periodic MCP packets as part of a miscabling protocol implemented to detect loops involving the network fabric. The system 110 can also be configured to instantiate, or listen for, MCP packets that ingress on its ports. The system 110 can also send MCP packets on its ports for each EPG or VLAN configured on its ports. This can ensure that loops are detected across EPGs and VLANs where they would not otherwise be detected by STP.

Next, a receiving switch located on the network fabric receives, via a receiving port, the MCP packet (1002). Based on the MCP packet, the receiving switch detects a loop between the receiving port, the originating port, and the external network (1004). Here, the external network can be marked on the system 110 and the receiving switch as being in the same bridge domain, while the originating and receiving ports can be marked on the external network as being on the same VLAN, thus creating a loop when a broadcast is transmitted to the external network via the originating or receiving ports.

Moreover, the receiving switch can be a leaf switch 304, as illustrated in FIG. 3. In some embodiments, the receiving switch is a ToR switch on the fabric 312. The receiving switch can identify or detect the loop based on a receipt of the MCP packet. Since the MCP packet was sent from a non-fabric port on the system 110 to the external network and addressed to a multicast address, the MCP packet should not be returned to any of the switches on the fabric 312 unless a loop exists between the fabric 312 and the external, L2 network. To detect or identify the loop, the receiving switch can extract the identity or address of the originating switch (i.e., system 110) as well as the port number of the originating port, and compare the extracted information with the identity or address of the receiving switch and port number of the receiving port.

In some cases, the receiving switch and the system 110 can be the same device. Here, the loop would be a self-loop or hairpin loop. In other cases, the receiving switch and the system 110 can be separate leaf switches 304 on the fabric 312.

Next, the receiving switch or the system 110 can block the receiving port or the originating port in response to detecting the loop. For example, the receiving switch or the system 110 can select a port to block from the originating port and the receiving port. The selected port to block can be based on one or more factors, such as current or future load, subnet, statistics, priorities, preferences, etc. In some embodiments, the selected port is selected based on a comparison of priorities between the system 110 and the receiving switch. Moreover, when blocking a port, the switch can operate the port in strict mode or non-strict mode, as illustrated in FIGS. 8A and 8B.

For clarity of explanation, in some instances the present technology may be presented as including individual functional blocks including functional blocks comprising devices, device components, steps or routines in a method embodied in software, or combinations of hardware and software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A computer-implemented method comprising:
    receiving, via a receiving non-fabric port on a receiving switch located on a network fabric, a miscabling protocol packet indicating an identity of an originating switch on the network fabric and an originating non-fabric port associated with the originating switch, wherein the miscabling protocol packet is received from an external network connected to the receiving non-fabric port, wherein the originating switch and originating non-fabric port are also located on the network fabric and connected to the external network, wherein the receiving non-fabric port and the originating non-fabric port are both:
        on a same flood domain in the network fabric;
        associated with different virtual local area networks or endpoint groups associated with the network fabric; and
        assigned to a same virtual local area network on the external network; and
    based on the miscabling protocol packet, detecting a loop between the receiving port, the originating port, and the external network; and
    blocking at least one of the receiving port and the originating port associated with the miscabling protocol packet in response to detecting the loop.

2. The computer-implemented method of claim 1, wherein the miscabling protocol packet further indicates at least one of a timestamp and a checksum value associated with the miscabling protocol packet.

3. The computer-implemented method of claim 2, further comprising verifying an authenticity of the miscabling protocol packet based on at least one of the timestamp and the checksum value.

4. The computer-implemented method of claim 1, wherein the miscabling protocol packet is addressed to a multicast address associated with a miscabling protocol, and wherein at least one of the originating non-fabric port and the receiving non-fabric port is connected to an overlay network.

5. The computer-implemented method of claim 1, wherein the receiving switch comprises a leaf switch, and wherein the network fabric is based on a spine-leaf topology.

6. The computer-implemented method of claim 1, wherein detecting the loop is based on a receipt of the miscabling protocol packet by the receiving switch.

7. The computer-implemented method of claim 1, wherein identifying the loop is further based on a difference between a first address associated with the originating non-fabric port and a second address associated with the receiving non-fabric port.

8. The computer-implemented method of claim 1, wherein detecting the loop is further based on at least one of a first determination that the originating switch is also the receiving switch and a second determination that the originating non-fabric port is also the receiving non-fabric port.

9. The computer-implemented method of claim 1, wherein the external network comprises a layer 2 network.

10. The computer-implemented method of claim 9, wherein the layer 2 network is set at the receiving non-fabric port and originating non-fabric port as a same bridge domain.

11. The computer-implemented method of claim 1, wherein the receiving switch is configured to send at least one miscabling protocol packet periodically at configured intervals.

12. The computer-implemented method of claim 1, wherein the receiving switch is configured to listen to miscabling protocol packets.

13. The computer-implemented method of claim 1, further comprising:
sending at least one miscabling protocol packet for each configured virtual local area network on each of a plurality of non-fabric ports on the receiving switch, and
wherein detecting the loop is based on a determination that the miscabling protocol packet was sent by the originating non-fabric port over a first virtual local area network or endpoint group and received by the receiving non-fabric port on a second virtual local area network or endpoint group that is different than the first virtual local area network or endpoint group.

14. The computer-implemented method of claim 1, wherein blocking at least one of the receiving non-fabric port and the originating non-fabric port is based on respective identities of the receiving non-fabric port and the originating non-fabric port, the method further comprising unblocking the at least one of the receiving non-fabric port and the originating non-fabric port after a timeout period.

15. The computer-implemented method of claim 14, wherein the unblocking is based on a strict mode where only one or more specific type of packets are allowed and other packets are blocked for at least a period of time.

16. A system comprising:
a processor; and
a computer-readable storage medium having stored therein instructions which, when executed by the processor, cause the processor to perform operations comprising:
receiving, via a receiving non-fabric port in a network fabric, a miscabling protocol packet indicating an identity of an originating switch in the network fabric and an originating non-fabric port associated with the miscabling protocol packet, wherein the miscabling protocol packet is received from an external network coupled with the receiving non-fabric port, and wherein the originating switch, the originating non-fabric port and the receiving non-fabric port are all located on the network fabric and coupled with the external network, and wherein the receiving non-fabric port and the originating non-fabric port are both:
on a same flood domain in the network fabric;
assigned to different virtual local area networks or endpoint groups in the network fabric; and
assigned to a same virtual local area network on the external network; and
based on the miscabling protocol packet, identifying a loop between the receiving non-fabric port on the network fabric, the originating non-fabric port on the network fabric, and the external network; and
re-configuring at least one of the originating non-fabric port and the receiving non-fabric port.

17. The system of claim 16, wherein re-configuring at least one of the originating non-fabric port and the receiving non-fabric port comprises blocking at least a portion of traffic on at least one of the originating non-fabric port and the receiving non-fabric port.

18. The system of claim 16, wherein identifying the loop is based on at least one of:
a determination that:
the system comprises both the originating switch and a receiving switch associated with the receiving non-fabric port; and
the system has both originated the miscabling protocol packet and received the miscabling protocol packet from the external network; or
a determination that:
the miscabling protocol packet was originated by a non-fabric port located in the network fabric where the receiving non-fabric port resides; and
the miscabling protocol packet was sent by the originating non-fabric port towards the external network via a first virtual local area network or endpoint group and received by the receiving non-fabric port from the external network via a second virtual local area network or endpoint group that is different than the first virtual local area network or endpoint group.

19. The system of claim 16, wherein re-configuring at least one of the originating non-fabric port and the receiving non-fabric port comprises blocking a selected one of the originating non-fabric port or the receiving non-fabric port, the selected one of the originating non-fabric port or the receiving non-fabric port being selected based on a comparison of a first address associated with the originating switch and a second address associated with the system.

20. A computer-readable storage hardware device having stored therein instructions which, when executed by one or more processors, cause the one or more processors to perform operations comprising:
receiving, from an external network and via receiving non-fabric port on a receiving switch located on a network fabric, a miscabling protocol packet indicating an identity of an originating switch on the network fabric and an originating non-fabric port associated with the originating switch, the receiving non-fabric port and the originating non-fabric port being connected to the external network, wherein the originating non-fabric port and the receiving non-fabric port are both:
on a same flood domain in the network fabric;
mapped to different virtual local area networks or endpoint groups on the network fabric; and
assigned to a same virtual local area network on the external network; and based on the miscabling protocol packet, detecting a loop between the receiving non-fabric port, the originating non-fabric port, and the external network; and blocking at least one of the receiving non-fabric port and the originating non-fabric port.

21. The computer-readable storage hardware device of claim 20, wherein detecting the loop is based on a determination that the receiving switch and the originating switch are both located in the network fabric.

22. The computer-readable storage hardware device of claim 20, wherein the receiving switch and the originating switch are a same switch.

23. The computer-readable storage hardware device of claim 20, wherein the receiving switch and the originating switch comprise leaf switches on the network fabric, and wherein the leaf switches are top-of-rack switches.

24. The computer-readable storage hardware device of claim 20, storing additional instructions which, when executed by the processor, result in operations further comprising:

generating miscabling protocol packets; and sending, via the receiving switch, the miscabling protocol packets to each endpoint group or virtual LAN configured on the receiving switch, wherein the miscabling protocol packets have at least one of a multicast or broadcast destination address, wherein each of the miscabling protocol packets includes a first indication that the receiving switch originated the miscabling protocol packet and a second indication identifying which non-fabric port on the receiving switch transmitted the miscabling protocol packet.

25. The computer-readable storage hardware device of claim 24, storing additional instructions which, when executed by the processor, result in operations further comprising:

periodically sending the miscabling protocol packets to the multicast or broadcast destination address.

\* \* \* \* \*